United States Patent
Okamura et al.

(10) Patent No.: US 7,179,022 B2
(45) Date of Patent: *Feb. 20, 2007

(54) CUTTING TOOL COATED WITH DIAMOND

(75) Inventors: Takashi Okamura, Aichi (JP); Satoshi Iio, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 493 days.

This patent is subject to a terminal disclaimer.

(21) Appl. No.: 10/242,141

(22) Filed: Sep. 12, 2002

(65) Prior Publication Data
US 2004/0115434 A1    Jun. 17, 2004

Related U.S. Application Data

(62) Division of application No. 09/470,732, filed on Dec. 22, 1999, now Pat. No. 6,705,806.

(51) Int. Cl.
*B23P 27/14* (2006.01)
*B23P 15/28* (2006.01)

(52) U.S. Cl. .................. 407/113; 407/118; 407/119
(58) Field of Classification Search ............. 407/113, 407/118, 119; 428/172, 212
See application file for complete search history.

(56) References Cited

U.S. PATENT DOCUMENTS

| | | | |
|---|---|---|---|
| 3,369,283 A | 2/1968 | Colding | |
| 3,557,266 A * | 1/1971 | Chiba et al. | 65/43 |
| 4,504,284 A | 3/1985 | Ohno | |
| 4,842,937 A * | 6/1989 | Meyer et al. | 428/408 |
| 4,884,476 A | 12/1989 | Okuzumi et al. | |
| 4,946,319 A | 8/1990 | Lyon et al. | |
| 5,139,372 A | 8/1992 | Tanabe et al. | |
| 5,477,754 A * | 12/1995 | Herbon | 407/113 |
| 5,551,959 A * | 9/1996 | Martin et al. | 51/295 |
| 5,667,344 A | 9/1997 | Simpson et al. | |
| 5,725,932 A | 3/1998 | Iio et al. | |
| 5,853,268 A | 12/1998 | Simpson | |
| 5,858,480 A | 1/1999 | Iio et al. | |

(Continued)

FOREIGN PATENT DOCUMENTS

EP    0 627498 A1    7/1994

(Continued)

OTHER PUBLICATIONS

Processing of CVD Diamond Films by YAG Laser 56, 12 (1990) 2255-2260 Shinichi Tezuka and Masanori Yosikawa.

*Primary Examiner*—Dana Ross
(74) *Attorney, Agent, or Firm*—Morrison & Foerster LLP

(57) ABSTRACT

A cutting tool coated with diamond in which diamond is coated as a film on a substrate having a step 15 to 500 μm in height in the vicinity of a cutting edge on the rake surface and/or the flank surface. Only the diamond film in the vicinity of the cutting edge can be polished first, without polishing the film of the diamond formed centrally of the rake surface and/or the flank surface. This enables the maximum effect (sharpening of the cutting edge and prevention of welding formation at cutting edge) to be realized with the necessary minimum polishing (with a decreased polishing removal), without setting special conditions and which is suited as a finishing tool.

9 Claims, 10 Drawing Sheets

U.S. PATENT DOCUMENTS

| | | | |
|---|---|---|---|
| 6,010,283 A | 1/2000 | Henrich et al. | |
| 6,096,377 A * | 8/2000 | Karner et al. | 407/119 |
| 6,106,585 A | 8/2000 | Packer et al. | |

FOREIGN PATENT DOCUMENTS

| | | |
|---|---|---|
| EP | 0 864668 A1 | 9/1998 |
| FR | 2 668 968 | 5/1992 |
| JP | 62-41800 | 2/1987 |
| JP | 63-57160 | 3/1988 |
| JP | 63-144940 | 6/1988 |
| JP | 3-67602 | 3/1991 |
| JP | 3-190605 | 8/1991 |
| JP | 4-201102 | 7/1992 |
| JP | 4-331800 | 11/1992 |
| JP | 7-60509 | 3/1995 |
| JP | 7060509 * | 3/1995 |
| JP | 7-90321 | 4/1995 |
| JP | 7-112641 | 12/1995 |
| JP | 10-310494 | 11/1998 |

* cited by examiner

FIG. 8

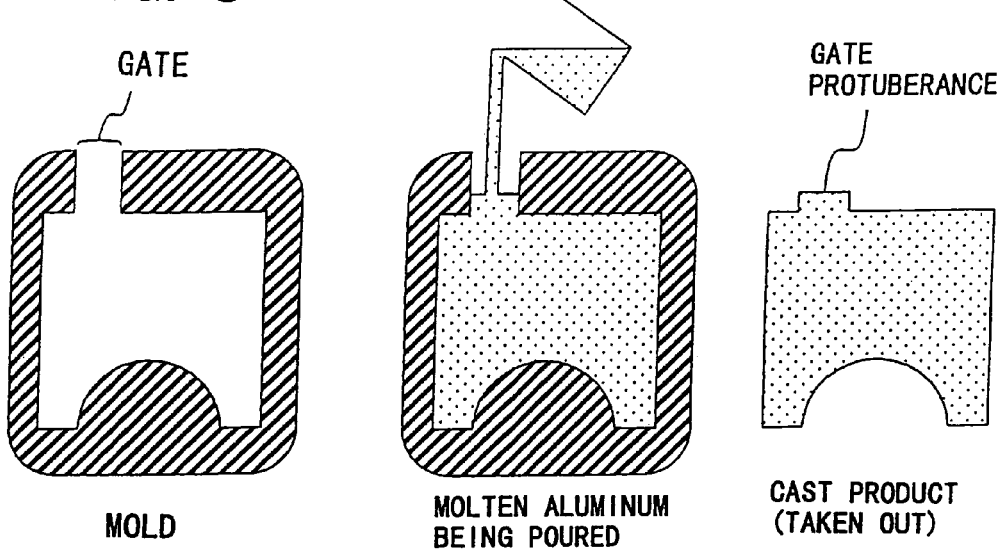

MOLD  MOLTEN ALUMINUM BEING POURED  CAST PRODUCT (TAKEN OUT)

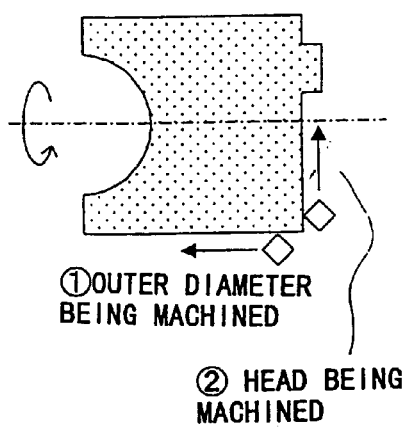

① OUTER DIAMETER BEING MACHINED
② HEAD BEING MACHINED

[WORK]
SHAPE: piston for engine
MATERIAL: AC8A
 (Al alloy containing 12% Si)
OUTER DIAMETER: ca. 110mm
LENGTH: ca. 110mm
[OUTER DIAMETER MACHINING CONDITIONS]
RPM N: 500rpm
SPEED: ca. 125m/min
FEED f: 0.2mm/rev
CUTTING REMOVAL d:
 2~3mm
[HEAD MACHINING CONDITION]
RPM N: 1600rpm
SPEED: ca. 400m/min
FEED f: 0.25mm/rev
CUTTING REMOVAL d:
 0.5~5mm (maximum at gate protuberance)

102  101

102  101

CUTTING TOOL COATED WITH DIAMOND

REFERENCE TO RELATED APPLICATION

This application is a division of Ser. No. 09/470,732, filed Dec. 22, 1999, now U.S. Pat. No. 6,705,806.

FIELD OF THE INVENTION

This invention relates to a cutting tool coated with diamond. More particularly, it relates to a throw-away cutting tool coated with a film of diamond and which is used as a cutting bit or insert, a milling cutter, an end mill or a drill.

1. Definition

The term "diamond" or "diamond film" used herein denotes not only pure crystalline diamond but what is synthesized as a diamond film, i.e., embracing diamond-like carbon, graphite or amorphous carbon, or a mixture thereof. Such diamond may be sometimes called diamond-or-the-like or pseudo-diamond.

2. Related Art

If diamond is applied in a film shape on a cemented carbide substrate, a cutting edge is rounded due to the presence of the diamond film. The rounding becomes more pronounced the thicker the diamond film, with the result that the tool is lowered in cutting performance. Moreover, since irregularities due to the diamond crystals are present on the as-coated diamond film surface, the cutting chips are hardly removed to produce a large cutting resistance. In addition, welding tends to be produced to affect the durability of the cutting tool.

The routine practice for coping with this problem has been to grind the diamond film surface, after diamond coating, to sharpen the cutting edge, or to smooth the film surface to prevent welding.

For sharpening the cutting edge of the cutting tool, there is disclosed in JP Patent Kokai JP-A-3-67602 a technique of polishing both the rake surface and the flank surface, following diamond coating, to sharpen the cutting edge. On the other hand, there is disclosed in JP Patent Kokai JP-A-4-201102 a technique of polishing the rake surface smooth following diamond coating, and of polishing the diamond film off from the flank surface to sharpen the cutting edge.

Among known techniques used for polishing natural or artificial single crystal diamond, there are techniques such as co-grinding with a diamond wheel having diamond abrasive grains or diamond particles embedded therein and scarfing polishing employing a cast iron plate. However, if, in these methods, the co-grinding pressure is raised, or the tool is contacted with a diamond wheel rotating at an elevated speed, the coated diamond film tends to be peeled off.

Thus, in the JP Patent Kokai JP-A-62-41800, JP Patent Kokai JP-A-63-144940 and in the JP Patent Kokai JP-A-63-57160, such a method is proposed in which, for improving the polishing efficiency, the diamond surface of the substrate is contacted in a non-oxidizing atmosphere with a heated metal surface to graphitize the diamond on the film surface to remove the graphitized diamond.

As other smoothing methods, there is disclosed in JP Patent Kokai JP-A-4-331800 a method of sputtering the diamond film surface with an ion beam. There has also been reported in Yoshikawa et al., Processing or CVD Diamond Films by YAG Laser: Journal of Precision Engineering, 55, 12(1990) 2256, a method of machining the diamond film by the laser light.

There is also proposed, in JP Patent Kokai JP-A-3-190605, a method of polishing a portion of a diamond film on the substrate of the cutting tool which is formed on the cutting edge and in a portion extending from the cutting edge to a portion of the flank surface, using a brush carrying deposited polishing abrasive grains.

In connection with the shape or the structure of stepped portions on the rake surface of the tool cutting, there is shown in JP Patent Kokai JP-A-7-60509 such a shape or structure in which triangular-shaped steps (convexed portions) are provided at the four corners of the square-shaped substrate, cemented carbide films, such as diamond films, are applied to these portions, and only the cemented carbide film portions at the corner portions are polished to a smooth finish as compared with the surface roughness encountered at the time of film deposition (see FIGS. 7 and 10).

SUMMARY OF THE DISCLOSURE

However, in the course of the investigations toward the present invention the following problems have been encountered. Namely, the problems of the above-described conventional techniques are hereinafter scrutinized.

The techniques proposed in the above-mentioned JP Patent Kokai JP-A-3-67602 or in the JP Patent Kokai JP-A-4-201102 suffer a problem that the polishing operation is time-consuming because the entire rake surface needs to be polished. On the other hand, if the diamond film on the flank surface is polished off, the state of an edge portion is such that the diamond film and the boundary surface of the substrate are exposed to the exterior, so that the tool cannot withstand heavy duty cutting such as on aluminum alloys and hence the film tends to be peeled off.

The method of graphitizing and removing diamond, as disclosed in the above-mentioned JP Patent Kokai JP-A-62-41800, suffers problems that the method requires heating to elevated temperatures, and is necessarily of the batch type because the processing is carried out under the non-oxidizing atmosphere, and that a special equipment is required for assuring safety if hydrogen is used as an atmosphere, so that the method is not suitable for industrial production.

On the other hand, the technique of sputtering or machining of the diamond film surface by an ion beam or the laser suffers a problem that the apparatus is complex in structure and low in mass producibility such that the technique is not suitable for industrial production.

With the method of polishing the cutting edge of the diamond film using a brush carrying deposited grinding grains, as proposed in JP Patent Kokai JP-A-3-190605, the major portion of the irregularities ascribable to the inherent shape of the diamond grains in the vicinity of the edge are removed on polishing, so that it is possible to prevent the lowering of the weld as well as to prevent the work surface from becoming roughed due to transcription of the irregularities ascribable to the inherent shape of the diamond grains. However, since the polishing is carried out by a brush, a rounded tool cutting portion cannot be sufficiently removed due to dulling by polishing, with the result that sharp edges usable for finishing machining cannot be obtained. There is also a problem that technical difficulties are encountered in polishing only the vicinity of the edge portions by a simple well-known technique other than polishing with a brush. For example it is difficult to bring the diamond wheel into partial grinding contact with the work to high precision, such that the film coating tends to be peeled off.

Moreover, since the diamond film is inferior in general in tight adhesion to the substrate, in particular to the cemented carbide substrate, researches are proceeding for improving the adhesion of the diamond film. The present inventors have proposed a cutting tool with a coating of diamond which, by surface-processing the substrate by heat treatment (JP Patent Kokai JP-A-7-90321, corresponding to U.S. Pat. Nos. 5,858,480 and 5,725,932 and EP 0627498A) or by electrolytic etching (JP Patent Kokai JP-A-10-310494, corresponding to U.S. patent application Ser. No. 08/977,972, pending, and EP 0864688A), is endowed with sufficient adhesion to withstand heavy-duty cutting.

However, there are occasions where the substrate becomes deformed by surface processing of the substrate to affect the polishing operation on the coated diamond film. Specifically, there are occasions where a mid portion of the cutting surface of the substrate becomes convexed(warped) upwards due to heat treatment such that the mid portion of the cutting surface becomes higher than the cutting edge by 5 to 30 µm. In the case of electrolytic etching, the speed of electrolytic etching at the cutting edge portion becomes faster than at other portions due to a higher current density, thus increasing the amount of the substrate removed from the cutting edge portion. This occasionally gives the shape of the tool in which the cutting edge portion is lower in height than the mid portion of the rake surface by to 5 to 15 µm.

In any of the above-described techniques, the mid portion of the rake surface of the substrate becomes higher in height than the cutting edge portion, so that, if the polishing is performed after coating the diamond film for sharpening the cutting edge, the convexed mid portion of the rake surface is initially contacted with the polishing wheel, however, the cutting edge, which is to be polished, is hardly polished.

If the diamond film is polished, using a metallic material heated to raise the polishing speed, as disclosed in the aforementioned JP Patent Kokai JP-A-62-41800, prolonged machining is required for polishing up to the cutting edge sufficiently. Also, if the substrate has warping, the mid portion of the rake surface needs to be polished in addition to the portion that inherently needs to be polished, thus lowering the efficiency. Also, depending on the degree of the warping and the thickness of the diamond coating film, the diamond film is removed excessively to expose the substrate to the exterior.

In a cutting tool in which the triangular-shaped steps (convex portions) are provided at respective corners of the square-shaped rake surface, as disclosed in JP Patent Kokai JP-A-7-60509, as shown in FIG. 10, there is a risk of the polishing quantity being increased to lower the polishing efficiency if, when the rake surface undergoes convexed warping, account is not taken of the height of the steps of the rake surface, diagonal lengths of the entire rake surface or of a width 105 of the step of the rake surface in the diagonal direction.

It is an object of the present invention to provide a cutting tool for diamond in which the cutting edge can be sharpened by polishing for only a short time and which can be conveniently used in particular as a tool for the finishing machining.

A substrate according to the present invention has its portion raised at a pre-set width along a cutting edge on a rake surface and/or on a flank surface. If diamond is applied as a film on a substrate having this shape, the film of diamond (may be termed as "pseudo-diamond") in the vicinity of the cutting edge as an effective cutting portion has a height larger than the remaining portions. The result is that, if the vicinity of the cutting edge is polished for sharpening the cutting edge or smoothing the effective cutting edge face, it becomes possible to preferentially polish the film of diamond in the vicinity of the cutting edge, without first polishing the film of diamond formed centrally of the rake surface and/or the flank surface, thus realizing the maximum effect (i.e., sharpening of the cutting edge and prevention of welded cutting chips) with the necessary minimum polishing (with a decreased removal by polishing). The result is that the sharpening of the cutting edge and smoothing of the effective rake surface can be easily realized in short time by polishing by scarfing (polishing over a wide area) suited to industrial production.

The substrate according to the present invention is useful as a substrate subjected to pre-processing (surface modification), such as heat treatment, for improving tight adhesion between the film of diamond with the substrate. The reason is as follows: There are occasions where this heat treatment deforms the substrate or causes warping such that the rake surface and/or the flank surface is raised at its center portion. If, due to this warping, the film of diamond at the center of the rake surface and/or the flank surface is higher in level than the diamond film in the vicinity of the cutting edge, it is necessary to polish the diamond film at the mid portion excessively in an amount corresponding to the warp. Since the diamond is the hardest of various materials, this difference in the polishing amount gives rise to an appreciably prolonged period of time for machining. According to the present invention, the removal by polishing for this portion that need not be polished can be decreased significantly or even reduced to zero.

BRIEF DESCRIPTION OF THE DRAWINGS

FIGS. 1A and 1B illustrate the shape of the step of a cutting tool embodying the present invention, wherein FIG. 1A shows a triangular-shaped step and FIG. 1B shows an L-shaped step.

FIGS. 3A and 3B illustrate the shape of a cutting tool according to an Example A of the present invention, wherein FIG. 3A is a top plan view and FIG. 3B is an end side view.

FIGS. 4A and 4B illustrate the shape of a cutting tool according to an Example B of the present invention, wherein FIG. 4A is a top plan view and FIG. 4B is an end side view.

FIGS. 5A and 5B illustrate the shape of another cutting tool according to the Example B of the present invention, wherein FIG. 5A is a top plan view and FIG. 5B is an end side view.

FIGS. 6A and 6B illustrate the shape of a cutting tool according to an Example C of the present invention, wherein FIG. 6A is a top plan view and FIG. 6B is an end side view.

FIGS. 7A and 7B illustrate the shape of a cutting tool according to a Comparative Example, wherein FIG. 7A is a top plan view and FIG. 7B is an end side view.

FIG. 8 shows an example of a case wherein a long cutting edge is required at the time of cutting in the cutting tool.

FIGS. 10A to 10C illustrate a conventional cutting tool in which a triangular step is formed at each corner of a substrate, wherein FIG. 10A is a top plan view showing a step having a small cutting edge, FIG. 10B is a top plan view of a step having a large cutting bit and FIG. 10C is a cross-sectional view taken along a diagonal line.

PREFERRED EMBODIMENTS OF THE INVENTION

Figure 1A:
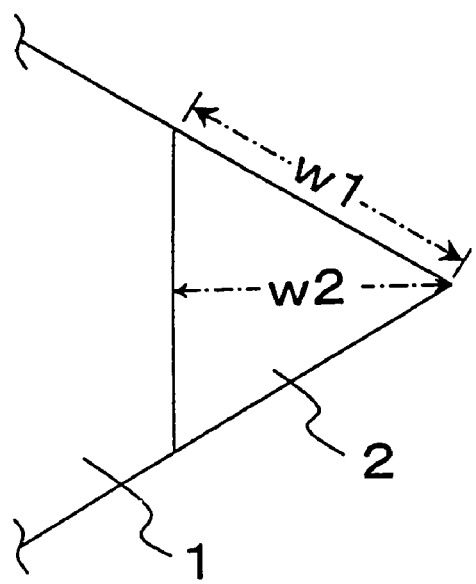

Preferred embodiments of the present invention are now explained in detail.

In the present embodiments of the present invention, the step height is designed, depending on the predicted quantity of warp, which is approximately 50 μm or less, so that, if the pre-coating substrate is subjected to warping, such as by pre-processing (surface modification) executed for improving adhesion of the diamond, the diamond film coating the vicinity of the cutting edge is higher in level than the diamond film that coats the mid portion of the substrate. The step height is preferably 15 to 500 μm, more preferably 20 to 300 μm and most preferably 50 to 200 μm. This prevents the step difference from disappearing by pre-processing, while preventing the diamond film from becoming peeled off at the step difference portion.

In the preferred embodiments of the present invention, the step width or the step height is set depending on the polishing efficiency or the configuration of a cutting edge portion, such as cutting edge width and/or depth of cut.

In the preferred embodiments of the present invention, the areal ratio (%) of the raised portion of the substrate to its entire surface (area of the raised portion/area of the entire basis surface), is 1.5% to 75%. This assures a sufficient width of the raised step portion in the vicinity of the cutting edge (cutting edge portion), while preventing welding and improving the durability and the polishing efficiency. More desirably, the areal ratio is set to 3% to 65% and, most desirably, it is set to 5% to 50%.

In a preferred form of the present invention, the steps are provided for extending along the cutting edge of the rake surface or the flank surface. In another preferred form, the steps are provided on at least the rake surface among the cutting surfaces in the cutting edge portion. The step boundary may be set to be upstanding (steep cliff) or may be continuously changing in height.

For obtaining the stepped substrate, it is possible to prepare a stepped molded article at the outset using a stepped metallic mold in compression molding a powder mixture of a starting cemented carbide material. It is also possible to prepare a blank of cemented carbide and subsequently machine the blank to a stepped shape using known machining techniques, such as electrical discharge machining or sandblasting.

In the preferred embodiments of the present invention, cemented carbide alloys, such as WC-based, TiC-based or TaC based cemented carbide alloys, cermet-based or ceramic-based materials, are used as the substrate. As a film-shaped coating for the substrate, diamond, cBN, mixtures (composite layers) thereof, or an extremely hard material, is used.

In the preferred embodiments of the present invention, the substrate is surface-treated by heat treatment or electrolytic etching, prior to polishing the diamond film, in order to raise the adhesion between the substrate and the diamond film. Among base materials suited to this surface processing method, there are cemented carbides, such as WC group based cemented carbides, cermet and ceramics. In the JP Patent Kokai JP-A-7-90321 and in JP Patent Kokai JP-A-10-310494 by the present inventors, there are contained descriptions on heat treatment and electrolytic etching, to which reference is to be had as necessary in the present specification, the entire disclosure thereof being incorporated herein by reference thereto.

The substrate of the present invention is suitably applied when the substrate undergoes slight deformation in shape due to pre-processing, performed for improving the adhesion, such that μm-level warping occurs to produce a convexed mid portion in the same plane, with edge portions in the same plane being recessed on the μm level as compared to the mid portion.

A preferred method for forming a diamond film and pre-processing (surface modification) therefor are now explained.

[Damaging Processing]

After the pre-processing for the substrate, such as after electrolytic etching, removal processing by an acid or masking with an intermediate coating layer may be carried out for suppressing the effect of a bonding phase component present on the substrate surface. For improving the quantity of generation of diamond nuclei, such a damaging processing can be performed in which the substrate is immersed for ultrasonic processing in an acetone solution having dispersed therein fine diamond particles having a mean particle size of 5 to 10 μm.

[Method for Diamond Synthesis]

For synthesis of diamond to the processed substrate, any suitable known methods for gas-phase diamond synthesis, such as the CVD or PVD methods, may be employed. In particular, a hot-filament method, a RF plasma CVD method or a micro-wave plasma CVD method, is preferred.

[Gases as Starting Material for Diamond]

As a starting material for diamond, any suitable material, such as carbides (for example methane, ethane or propane), alcohols (such as ethanol), CO or $CO_2$, may be used. These starting materials may be used alone or as a mixture and may also be diluted with a hydrogen gas or an inert gas.

[Method for Polishing Diamond Films]

The diamond film, applied on the substrate, can be polished using any optional polishing method. Preferably, such a method may be used which consists in polishing by scarfing, suited for industrial production, or in polishing a diamond surface by thrusting a diamond-coated insert against a rotating diamond wheel carrying diamond abrasive grains at a pressure insufficient to peel off the coated diamond coating.

In a present embodiment of the present invention, the following substrate material is heat-treated in the following manner, prior to diamond coating, for improving adhesion between the diamond film and the substrate.

As the substrate material, a WC-based cemented carbide, mainly composed of WC, and also containing other components, preferably Ti, with or without Ta, and at least one of Co and Ni, as a bonding phase. A preferred composition of the WC-based cemented carbide comprises 0.2 to 20 wt %, preferably 0.5 to 10 wt % and more preferably 1 to 5 wt %, of Ti, or Ti and Ta, as carbide, 2 to 15 wt %, preferably 3 to 10 wt %, more preferably 4 to 7 wt %, of at least one of Co and Ni, and at least one of a W—Ti—C solid solution (β-phase) and a W—Ti—Ta—C solid solution (βt-phase). A preferred mean crustal grain size of the β-phase and the βt-phase is 0.5 to 10 μm and preferably 1 to 5 μm.

If the content of Ti as carbide is less than 0.2 wt %, a N-containing irregular surface layer is not likely to be produced due to heat treatment, while the surface layer is liable to be detached following heat treatment. The reason the surface layer is liable to be detached is that the major portion of the Ti component migrates to a surface region by heat treatment to form a W—Ti—C—N solid solution (β(N)

phase) on the surface to separate the Ti component and other alloy components to affect the fitting state. If the amount of Ti as carbide exceeds 20 wt %, the substrate is already brittle prior to heat treatment, while the thermal expansion coefficient of the substrate is increased and the differential between the thermal expansion coefficient of the substrate and that of diamond is increased to produce a shearing stress on an interface between the substrate and the diamond film during cooling following diamond coating to give rise to film detachment(peeling-off).

This also accounts for the preferred upper limit value of 20 wt % of the cemented carbide in case Ta is contained in addition to Ti.

Meanwhile, Ta may be replaced in part or in its entirety by at least one of V, Zr, Nb and Hf, insofar as it does not affect the aforementioned heat treatment. It is noted that the WC-based cemented carbide, obtained on densely sintering powders of WC, TiC, TaC and/or Co by a powder metallurgical method, is lowered in strength if the carbide crystal phase undergoes grain growth during sintering. Thus at least one of Cr and Mo, suppressor of grain growth during sintering, can be contained, usually as carbides, within a range not affecting heat treatment in the present invention.

If the content of at least one of Co and Ni, as a bonding phase, is less than 2 wt %, it is difficult to achieve densification by sintering at the time of manufacturing the WC-based cemented carbide, such that characteristics required of the substrate, such as strength, would fall short. If the above content exceeds 15 wt. %, these components tend to appear (or migrate) on the substrate surface at the time of heat treatment or of forming the diamond film coating, thus incidentally affecting the formation of the diamond film. On the other hand, the thermal expansion coefficient differential from that of the diamond film may occasionally become larger to give rise to film detachment.

If the average particle size of the β-phase or the βt-phase is less than 0.5 μm, there are occasions where irregularities formed on the N-containing surface layer formed after the heat treatment become smaller or sufficient fitting (or mechanical engagement) between the N-containing surface layer and the WC-based cemented carbide inner layer cannot be achieved. If the above-mentioned average particle size exceeds 10 μm, there are occasions where above-mentioned fitting becomes insufficient, or the strength as the cemented carbide prior to heat treatment cannot be realized.

Meanwhile, in the case of a N-containing cemented carbide or cermet containing β(N) phase from the outset, due to sintering after addition of N-containing powders, such as a TiN or TiC—TiN solid solution or due to sintering in N atmosphere containing nitrogen atoms, there are occasions where the irregularities are not produced with ease even on heat treatment, or where the state of the irregularities becomes difficult to control by the heat-treatment atmosphere.

For correctly controlling the $N_2$ content in the heat treatment atmosphere for the WC-based cemented carbide, it is preferred to construct an oven used for heat treatment from refractories not affecting the $N_2$ content in the atmosphere.

The preferred heat treatment temperature for the WC-based cemented carbide is 1350 to 1450 degrees C., with the lower limit temperature differing with the carbon quantity in the alloy or with the Co/Ni quantity ratio.

The heat treatment time affects the degree of the irregularities on the N-containing surface layer most appreciably. By adjusting this factor, it becomes possible to form a N-containing surface layer having any desired irregularities. For producing a N-containing layer efficiently in stability, the heat treatment temperature or the amount of $N_2$ in the atmosphere may be adjusted to set the heat treatment time preferably to 0.5 to 5 hours.

The atmosphere for heat treatment contains $N_2$ in an amount of 0.05 to 5 vol. % at ambient pressure. Preferably, $N_2$ is contained in an amount of 0.5 to 3 vol. %, with the balance being an inert gas, such as Ar.

Alternatively, re-heating under an inert atmosphere, such as argon, may be carried out after formation of the N-containing irregular surface layer, for releasing N from the surface layer, insofar as this does not affect film deposition properties of the surface layer.

Still alternatively, as a method for achieving the meritorious effect equivalent to that of the above-mentioned re-heating, that is the effect of not having N contained on the uppermost surface, a hard coating of TiC may be applied by a well-known method, such as CVD or PVD, to a thickness which will not significantly affect the surface shape (or nature) of the irregular surface layer.

As a method for coating diamond, the so-called CVD method of contacting an excited gas mixture of a carbon source gas and a hydrogen gas may be used. In particular, a micro-wave plasma CVD method is preferably used as means for controlling the synthesis conditions to high accuracy.

As a preferred embodiment of the present invention, the following substrate material is used and etched in the following manner, prior to diamond coating, in order to improve adhesion to the diamond film.

As a substrate material, a cemented carbide substrate is composed mainly of tungsten carbide(WC) and also containing one or more selected from carbides, nitrides and carbonitrides of Ti, Ta, Nb and V in an amount of 0.3 to 10 wt % and preferably in an amount of 0.5 to 10 wt % as a converted weight as carbide, and Co and/or Ni in an amount of 2 to 10 wt % as a sum.

This substrate is of the so-called cemented carbide, mainly composed of WC, and is optimum in a bonding strength of the diamond film, owing to the fact that there is contained therein a hard phase containing one or more selected from carbides, nitrides and carbonitrides of Ti, Ta, Nb and V. The hard phase may also be in the form of a W-containing solid solution. Specifically, when forming irregularities on the substrate surface by electrolytic etching, the rate of removal of the hard phase mainly composed of carbides, nitrides and carbonitrides of Ti, Ta, Nb and V is slower than that of the hard phase mainly composed of WC, so that irregularities of a preferred form are formed on the electrolytically etched surface of the cemented carbide substrate containing the above compounds. If the sum of the amount of the carbides, nitrides and carbonitrides of Ti, Ta, Nb and V in the substrate, calculated as carbide, is less than 0.5 wt %, in particular than 0.3 wt %, the effect of having these components contained in the substrate is diminished. Conversely, with the above amount exceeding 15 wt %, the bonding strength tends to cease be improved further.

The desirable average particle size of the hard phase in the cemented carbide, mainly composed of the carbides, nitrides and carbonitrides of Ti, Ta, Nb and V, depends on the magnitude of the irregularities formed on the substrate surface. For obtaining the bonding strength of the large diamond film, the average crystal grain size of these compounds is preferably 0.3 to 5 μm, preferably 0.5 to 2 μm and more preferably 1 to 2 μm.

If the content of Co and/or Ni in the substrate is larger, the diamond film is lowered in bonding strength, whereas, if the content is smaller, the diamond film becomes lower in mechanical properties, such as strength. Therefore, the content is adjusted depending on the application of the cutting tool. It is noted that the combined amount is preferably 2 to 10 wt % and in particular 3 to 6 wt %, since then the cutting tool can be used for a wide variety of the fields of applications.

In the above-described cutting tool coated with diamond, diamond is preferably coated as a film on the substrate having portions raised at a pre-set width to a pre-set height along a cutting edge on the rake surface and/or the flank surface.

Also, in the cutting tool coated with diamond, the raised portion is preferably of a step of 15 to 500 µm.

Also, in the cutting tool coated with diamond, the rake surface in its entirety is substantially in the form of a polygon, such as square or parallelogram. The height of the step on the rake surface h (µm) is preferably related to a diagonal length W (mm) of the entire rake surface by $h \geq 2W+4$.

Figure 1B:
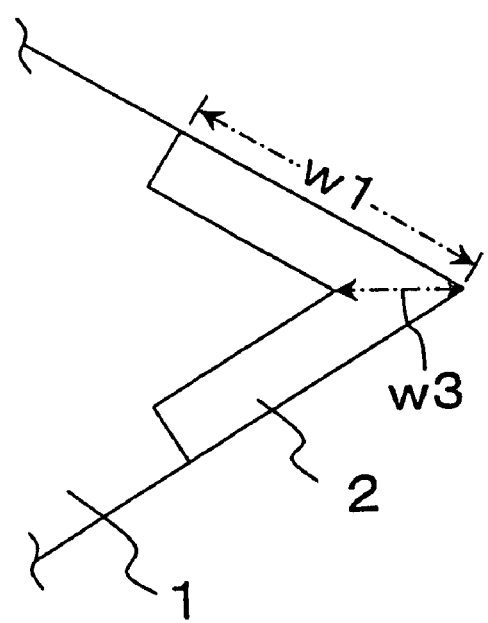
Figure 2A:
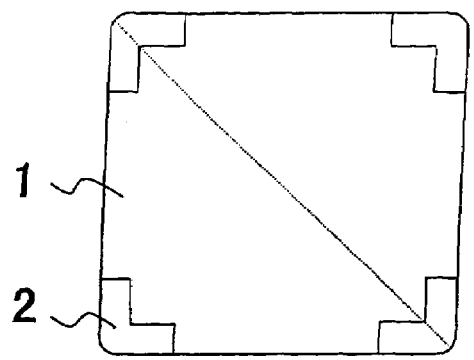
FIGS. 2A to 2F illustrate the shape of steps of cutting tools embodying the present invention and specifically are to plan views of various step patterns.
Figure 2D:
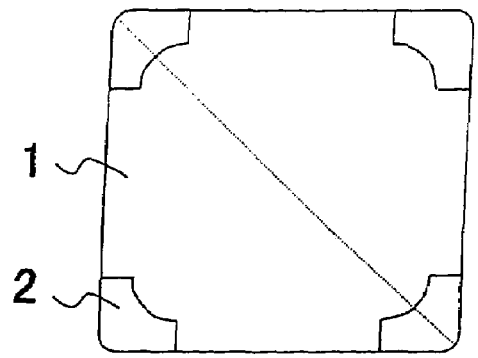
Figure 2B:
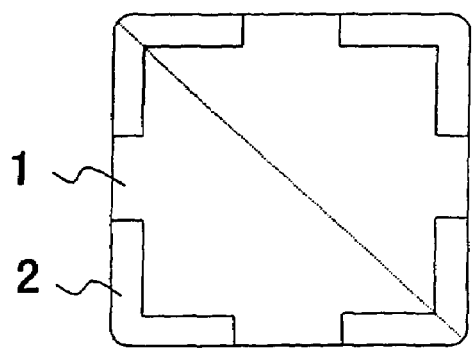
Figure 2E:
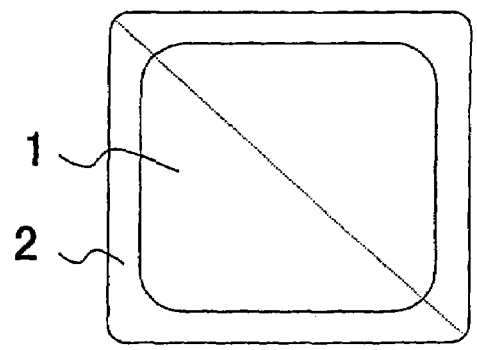
Figure 2C:
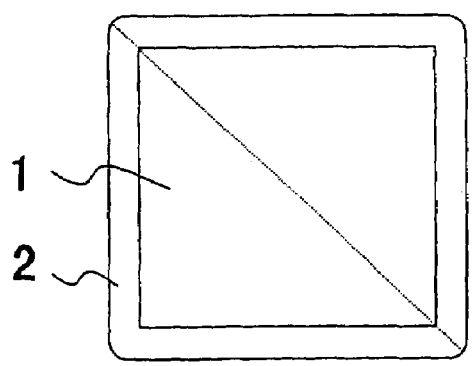
Figure 2F:
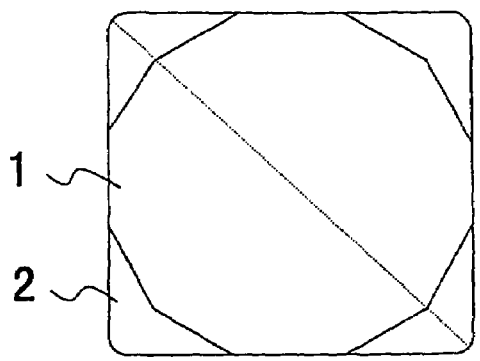
Figure 10A:
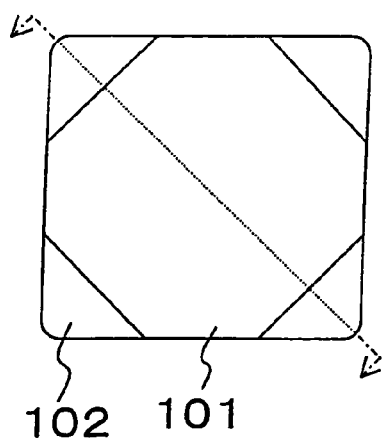
Figure 10B:
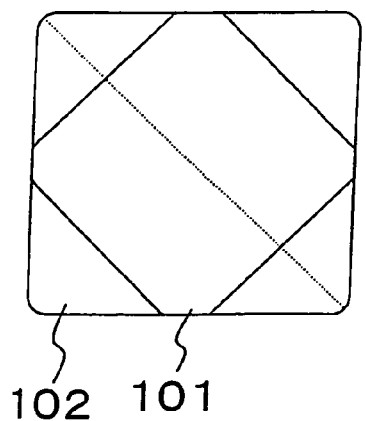
Figure 10C:
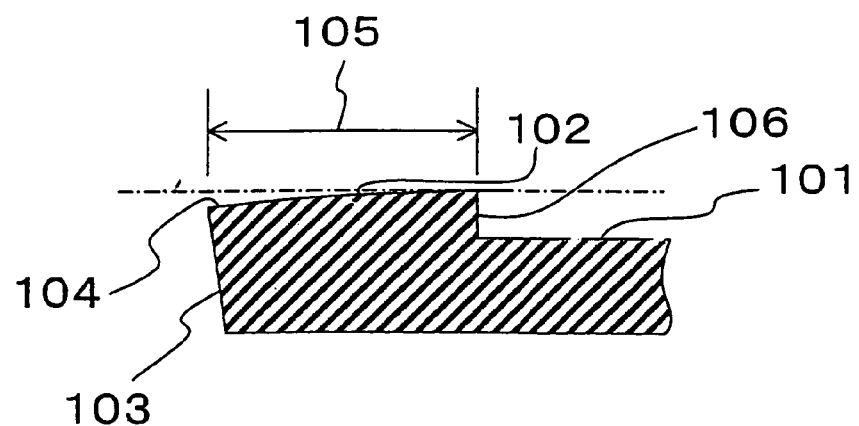

In the cutting tool coated with diamond, the shape of the step of the rake surface is preferably a partial V- or L-shape, having each corner as an apex point. Referring to FIG. 1, if the step shape is changed from a triangular shape FIG. 1A to a V- or an L-shape FIG. 1B, the width of the step in the diagonal direction of the rake surface can be decreased from w2 to w3 as the length w1 of the blade of the rake surface step 2 is maintained. That is, there is no risk of the step width increasing along the diagonal line of the rake surface as occurs when the triangular shape of the step of the rake surface is maintained and the cutting edge is increased in length, as shown in FIGS. 10A and 10B. This decreases the amount of polishing to increase the polishing efficiency further. Referring to FIG. 2, if the length of the cutting edge is increased from FIG. 2A to FIG. 2B, the polishing efficiency is not lowered, because the step of the rake surface in the diagonal direction remains constant. Similar operations and effects can be obtained for the patterns as shown in FIGS. 2D and 2F.

Also, in the cutting tool coated with diamond, the shape of the rake surface step is preferably annular or frame-shaped along substantially the entire periphery. Referring to FIG. 2, the V-shaped steps FIG. 2B are preferably interconnected to form an annular step FIG. 2C. If the rake surface step is annular or frame-shaped, the cutting edge length can be maximized with respect to the size of the cutting tool. Moreover, as for manufacturing, molding by a biaxial molding device is facilitated to reduce the number of the machining steps. Similar operations and results can be obtained with a pattern shown in FIG. 2E.

EXAMPLE

For clarifying the above-described embodiment of the present invention, an example of the present invention is hereinafter explained by referring to the drawings.

Example A

As starting powder material, WC powders, with an average particle size of 2 µm, powders of TiC—WC solid solution, TaC powders and Co, with an average particle size of 1 µm, were assorted in proportions shown in Table 1 (compositions A to D). The respective powder mixtures were press-molded at a pressure of 1.5 ton/cm² (approximately $1.47 \times 10^4$ N/m²). The resulting pressurized powders were fired in vacuum for one hour at 1400 to 1450 degrees C. to prepare sintered products having approximately the same compositions as the compositions indicated in Table 1. The surfaces of the sintered products were ground to prepare substrates which serve as a base shaped in accordance with the ISO standard SPGN 120304 to 120320.

Also, substrates serving as a base shaped in accordance with SPGN 120304 were prepared.

TABLE 1

| Composition symbol | TiC | TaC | Co | W and impurities | sintering temperature |
|---|---|---|---|---|---|
| A | 0.5 | — | 5 | balance | 1400° C. |
| B | 3 | — | 5 | balance | 1450° C. |
| C | 3 | 2 | 5 | balance | 1450° C. |
| D | 7 | 5 | 7 | balance | 1450° C. |

The relation between the length of a diagonal line of the rake surface of the substrate and the warping is explained. If the amount of warp is larger than the step height, the diamond film at the mid portion of the rake surface is contacted with the polishing wheel during polishing of the rake surface. Therefore, the provision of the step is meaningless. On the other hand, the longer the length of the diagonal line of the substrate, the larger is the warping. In light of the foregoing, tests were conducted on the relation between variations in the warping due to the length of the diagonal line and the step height. The results of the test on the relation between variations in the warping due to the length of the diagonal line and the step height are shown in Table 2. In this table, if the amount of warp is smaller than the step height, machining is presented to be possible, whereas, if the amount of warp is larger than the step height, machining is presented to be impossible.

TABLE 2

| substrate shape | length of diagonal line (mm) | step height (µm) | step height > amount of warp (flank surface polishing possible) | step height < amount of warp (flank surface polishing not possible) | number of tests | machinability (%) |
|---|---|---|---|---|---|---|
| SPGN120304 | ca. 16 | 40 | 10 | 0 | 10 | 100 |
| SPGN120304 | ca. 16 | 30 | 31 | 19 | 50 | 62 |
| SPGN120304 | ca. 16 | 20 | 12 | 38 | 50 | 24 |
| SPGN120304 | ca. 16 | 10 | 0 | 10 | 10 | 0 |
| CPGN120304 | ca. 18 | 50 | 10 | 0 | 10 | 100 |

TABLE 2-continued

| substrate shape | length of diagonal line (mm) | step height (μm) | step height > amount of warp (flank surface polishing possible) | step height < amount of warp (flank surface polishing not possible) | number of tests | machinability (%) |
|---|---|---|---|---|---|---|
| CPGN120304 | ca. 18 | 40 | 28 | 2 | 30 | 93 |
| CPGN120304 | ca. 18 | 30 | 18 | 12 | 30 | 60 |
| CPGN120304 | ca. 18 | 20 | 5 | 25 | 30 | 17 |
| CPGN120304 | ca. 18 | 10 | 0 | 30 | 10 | 0 |

Figure 3A:
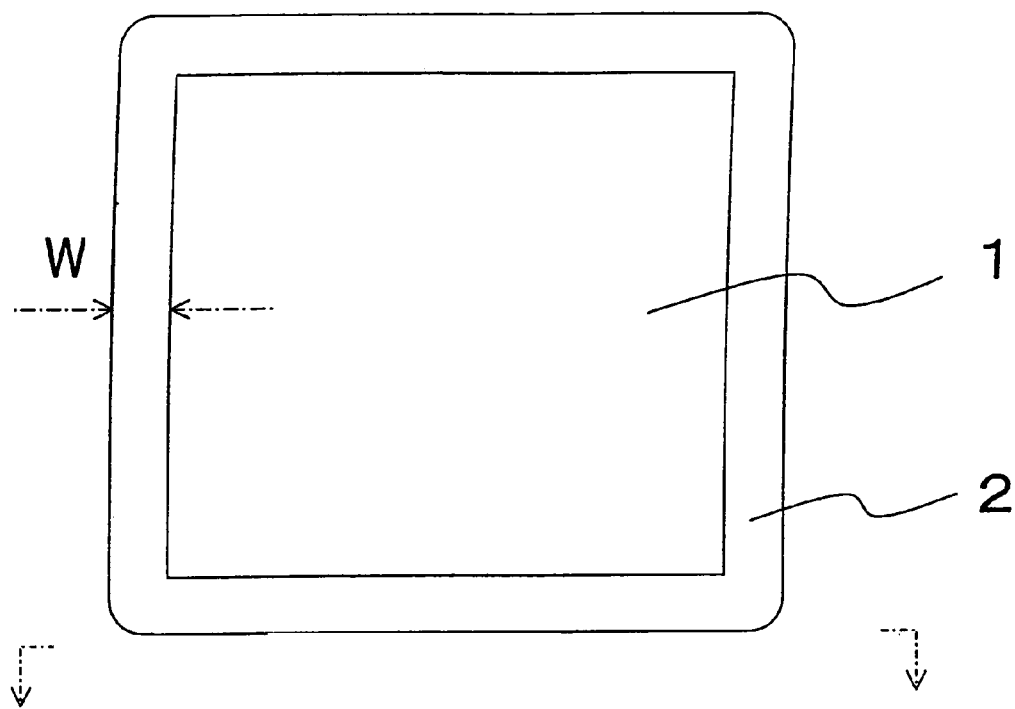
Figure 3B:
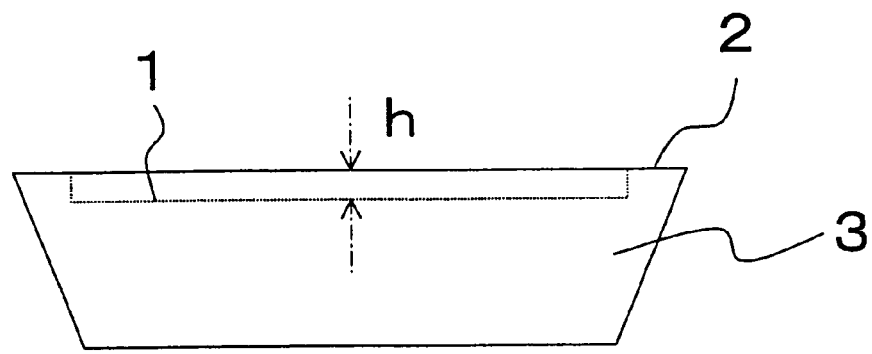

Using an electric discharge machine, shown in FIG. 3, a recess shown in FIG. 3 was formed at a mid portion of the rake surface of the substrate, so that a step dimensioned as shown in Table 3 will be formed along the four sides of the rake surface of the substrate. There were also provided a substrate having a narrow step width W, a substrate having a low step width and a substrate having no step (samples 10 and 11).

The substrate samples obtained were charged into a carbon casing and heat-treated for three hours at 1 atm ($1.013 \times 10^5$ N/m$^2$) and at 1350° C., in an atmosphere of 1 vol. % nitrogen and 99 vol. % argon, using an electrical furnace, the components of which were exposed to elevated temperatures, such as heater or insulating materials, were formed entirely of carbon. The substrate samples, thus processed, were immersed in a solvent in which fine diamond powders, with a mean particle size of 10 μm, were floated and dispersed. In this state, the substrate samples were ultrasonically processed to activate the entire surface.

The substrate, thus obtained, was installed in a microwave plasma CVD device of 2.45 GHz. The electric power was adjusted so that, under the total pressure of 50 Torr (about 6666 N/m$^2$), 85 vol % H$_2$ 15 vol % CO, the substrate temperature of 900° C. will be reached, to generate a plasma, which was maintained for 15 hours to apply the diamond coating to a film thickness of approximately 30 μm. It was seen that the diamond on the coating film surface was of a particle size of 10 to 15 μm and was in a state in which polycrystals presenting irregularities with a particle size of 10 to 15 μm were densely packed together.

TABLE 3

Example A (step shape conforms to FIG. 3)

| samples | material composition | substrate shape | step width W (mm) | step height h (mm) | areal ratio of cutting face area (%) | rake surface polishing time (min) | flank polishing time (min) | cutting edge R (μm) | depth of cut (mm) | initial surface roughness Rz (μm) | cutting time (min) |
|---|---|---|---|---|---|---|---|---|---|---|---|
| 1 | A | SPGN120304 | 0.5 | 0.1 | 15 | 30 | 30 | 5 | 0.3 | 5.2 | >100 |
| 2 | A | SPGN120304 | 0.1 | 0.05 | 3 | 15 | 30 | 5 | 0.1 | 5.1 | >100 |
| 3 | B | SPGN120304 | 2 | 0.2 | 55 | 180 | 30 | <10 | 0.5 | 5.5 | >100 |
| 4 | B | SPGN120308 | 1 | 0.1 | 30 | 90 | 30 | 5 | 0.2 | 3.7 | >100 |
| 5 | C | SPGN120308 | 1.5 | 0.1 | 42 | 120 | 30 | 5 | 0.5 | 4.1 | >100 |
| 6 | B | SPGN120308 | 0.5 | 0.5 | 15 | 30 | 0.5 | 5 | 0.1 | 3.8 | detached in 5 min |
| 7 | C | SPGN120308 | 1 | 0.01 | 30 | interrupted* | — | — | — | — | — |
| 8 | B | SPGN120308 | 0.04 | 0.1 | 1 | 5 | 0.5 | 5 | 0.1 | — | detached at the outset |
| 9 | C | SPGN120308 | 3.5 | 0.1 | 85 | 330 | 0.5 | <10 | 0.3 | 3.8 | >100 |
| 10 | C | SPGN120308 | ISO shape without step | | 100 | 360 | 0.5 | 5 | 0.2 | 3.8 | >100 |
| 11 | sintered diamond | SPGN120308 | ISO shape without step | | — | — | — | <5 | 0.2 | 3.6 | >100 |
| 12 | C | SPGN120308 | 1 | 0.1 | 40 | non-polishing | — | >30 | 0.2 | 7.2 | >100 |
| 13 | C | SPGN120312 | 1.4 | 0.1 | 40 | 90 | 0.5 | 5 | 1.0 | 2.8 | detached in 75 min |
| 14 | C | SPGN120312 | 2 | 0.2 | 55 | 180 | 0.5 | 10 | 1.2 | 3.1 | detached in 75 min |
| 15 | C | SPGN120320 | 2 | 0.2 | 55 | 180 | 0.5 | 10 | 1.5 | 2.2 | detached in 50 min |
| 16 | D | SPGN120320 | 3 | 0.4 | 70 | 200 | 0.5 | 15 | 2.0 | 4.3 | detached in 50 min |
| 17 | C | SPGN120304 | 0.5 | 0.005 | 30 | interrupted* | — | — | — | — | — |
| 18 | C | SPGN120304 | 0.5 | 0.02 | 30 | 15 | 15 | 5 | 0.1 | 4.8 | >100 |
| 19 | C | SPGN120308 | 1 | 0.04 | 30 | 90 | 30 | 5 | 0.2 | 3.9 | >100 |

*The polishing of samples 7 and 17 were interrupted because the warp of the material was higher than the step height such that the diamond film at a mid portion of the rake surface contacted with an abrasive whedel.

The back surface of the diamond-coated substrate was affixed to a polishing holder and polished as its rake surface was applied to a #1000 vitrified bond diamond wheel. It was seen that, as shown in Table 3, the polishing time for the rake surface was appreciably reduced in comparison with the sample 10 having no step in the rake surface.

Similar polishing was carried out on the flank surface to sharpen the cutting edge so that its R will be not larger than 10 μm. For comparison, the R value of the cutting edge at a cutting edge of a sample 12 not polished in this manner was not less than 30 μm.

Using the cutting inserts (tips), thus obtained, cutting tests were conducted under the following conditions. The inserts of the present embodiment exhibited surface roughness and durability equivalent to those of a sintered diamond tool. It may thus be seen that, according to the present invention, the inserts for finishing machining having the same performance can be obtained in a shorter insert polishing time.

Cutting test conditions: evaluation of roughness of surface to be processed (surface roughness of the turned outer peripheral surface of a cylindrical work)

Turned warkpiece: Al-18% Si alloy approximately 150 mm in diameter and approximately 200 mm in length Cutting speed: 800 m/min Feed: 0.15 mm/rev Depth of cut: 0.1 to 2.0 mm.

Example B

Using starting powders (see Table 4), adjusted at a mixing ratio of the composition B or the composition C of Example A (see Table 1), and a press molding metal die having a convex portion to generate a rake surface of the substrate having a step, a compacted powdered mass having a step at a portion corresponding to the rake surface was prepared by press molding under a pressure of 1.5 ton/cm$^2$ (approximately 1.47×10$^4$ N/m$^2$). This compacted powdered mass was sintered by a method which is the same as Example A to produce a sintered mass, the surface of which was then polished to produce a cemented carbide substrate having the basic shape according to the ISO standard CPGN 120408 with a step shown in FIG. 4 or 5 and with a step on the cutting edge of the configuration shown in Table 4. Meanwhile, the substrate shown in FIG. 4 has been formed by an electric discharge machine so that a recess will be present at the center of the rake surface, so that a step dimensioned as shown in Table 4 will be formed on the four sides of the rhombus-shaped rake surface. The substrate shown in FIG. 5 is formed by forming a groove centrally of the rake surface of the substrate, using a surface grinder, so that a step dimensioned as shown in Table 4 will be formed at the two corners of the rhombus-shaped rake surface. There was also provided a substrate having no step (sample 25).

These substrates were subjected to heat treatment, diamond coating and polishing for sharpening the cutting edge, as Example A. The produced inserts were subjected to the cutting tests, as in Example A, to evaluate surface roughness of the workpieces to confirm that a tool of a small surface roughness that can be used for cutting can be obtained by the polishing of a short duration as shown in Table 4.

TABLE 4

Figure 4A:
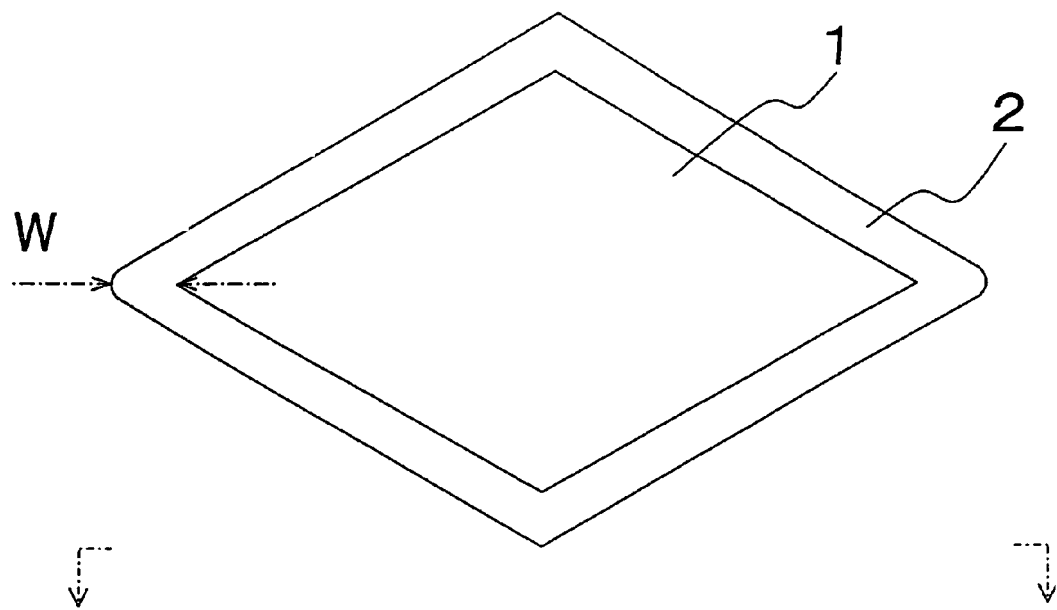
Figure 4B:
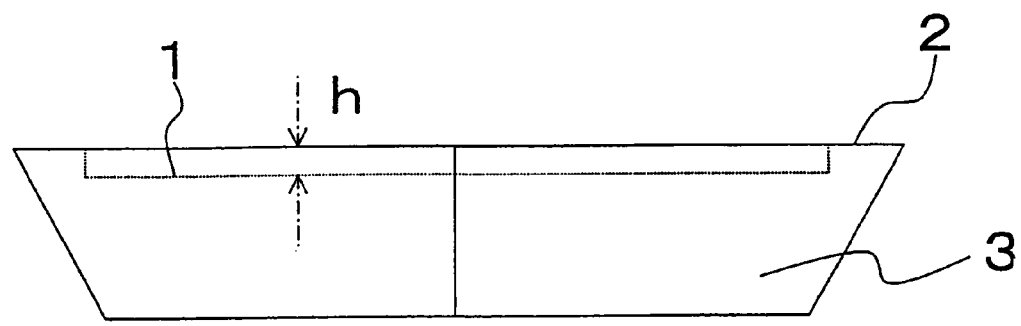
Figure 5A:
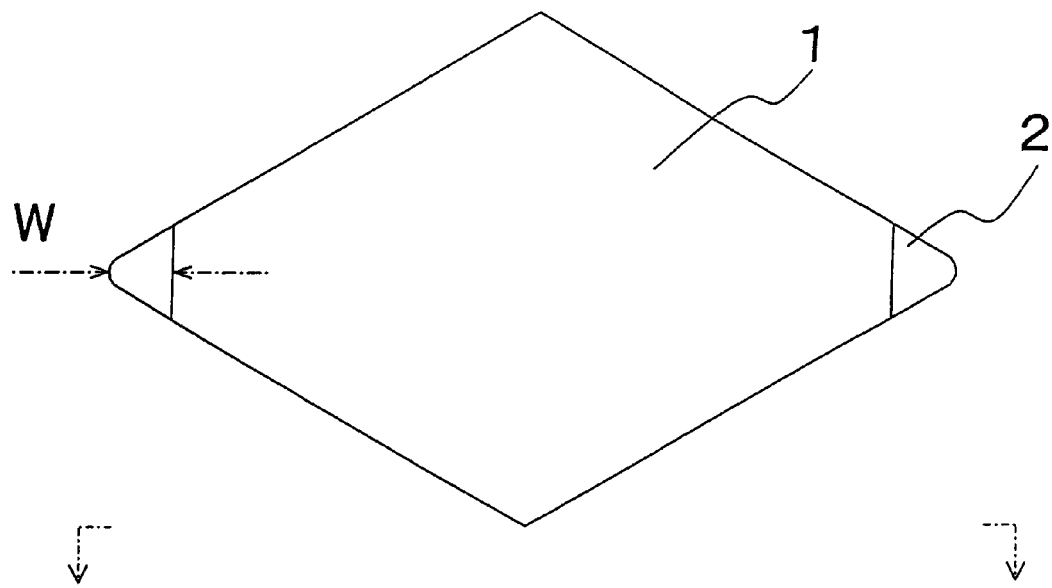
Figure 5B:
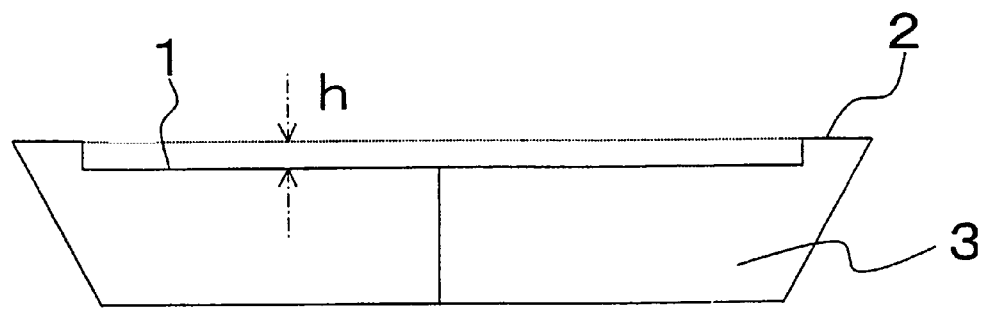

Example B (step shape conforms to FIGS. 4 and 5)

| samples | material composition | step shape | step width W (mm) | step height h (mm) | areal ratio of cutting face area (%) | rake surface polishing time (min) | flank polishing time (min) | cutting edge R (μm) | depth of cut (mm) | initial surface roughness Rz (μm) |
|---|---|---|---|---|---|---|---|---|---|---|
| 20 | C | FIG. 4 | 0.5 | 0.1 | 10 | 40 | 30 | 5 | 0.3 | 3.7 |
| 21 | C | FIG. 4 | 1.6 | 0.1 | 30 | 120 | 30 | <10 | 0.5 | 4.2 |
| 22 | B | FIG. 5 | 1.7 | 0.1 | 1.5 | 10 | 30 | 5 | 0.2 | 3.6 |
| 23 | B | FIG. 5 | 4.4 | 0.1 | 10 | 40 | 30 | 5 | 0.5 | 4.0 |
| 24 | B | FIG. 5 | 5.4 | 0.1 | 15 | 60 | 30 | 5 | 1.0 | 4.5 |
| 25 | C | no step | ISO shape without step | | 100 | 400 | 0.5 | 5 | 0.2 | 3.6 |
| 26 | C | FIG. 4 | 0.5 | 0.015 | 10 | interrupted* | — | — | — | — |

*The polishing of sample 26 was interrupted because the warp of the material was higher than the step height such that the diamond film at a mid portion of the rake surface contacted with an abrasive wheel.

Example C

WC powders with an average particle size of 2 μm, NbC powders with an average particle size not larger than 2 μm, TaC powders with an average particle size of 1 μm and Co powders with an average particle size of 1 μm, were mixed to give a composition 4 wt % (Ta, Nb). C-6 wt % Co-90 wt % WC, and the resulting mixture was molded. The resulting molded product was fired in vacuum for one hour at 1450° C. and the resulting sintered products were polished to a shape of the ISO standard SPGN120408 to prepare a cemented carbide blank.

Figure 6A:
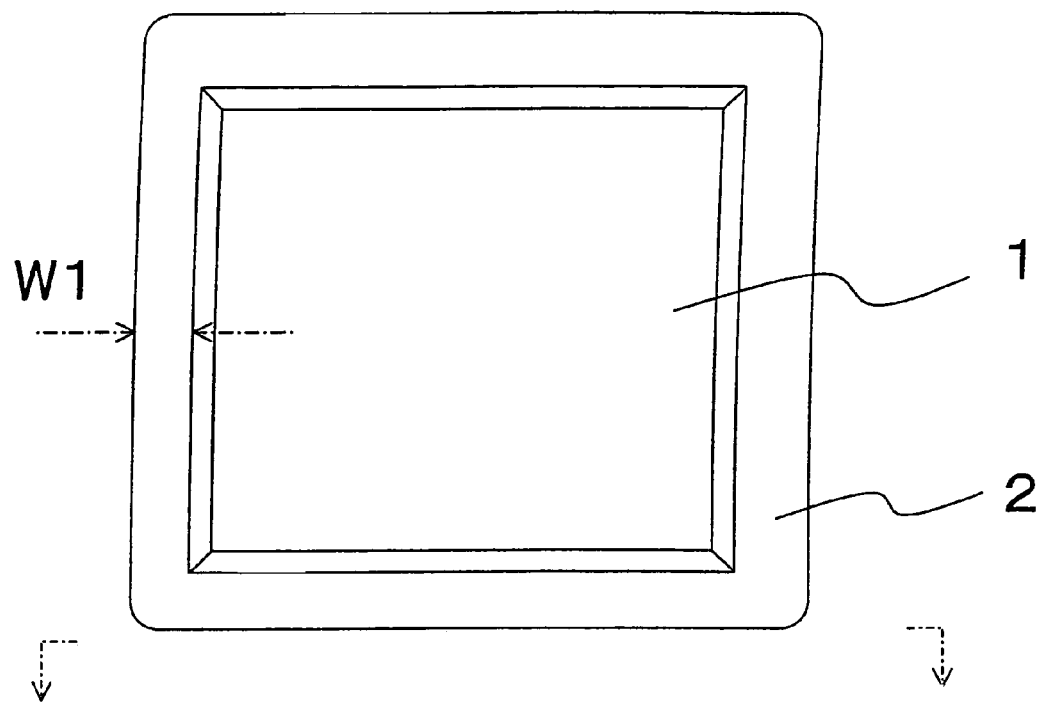
Figure 6B:
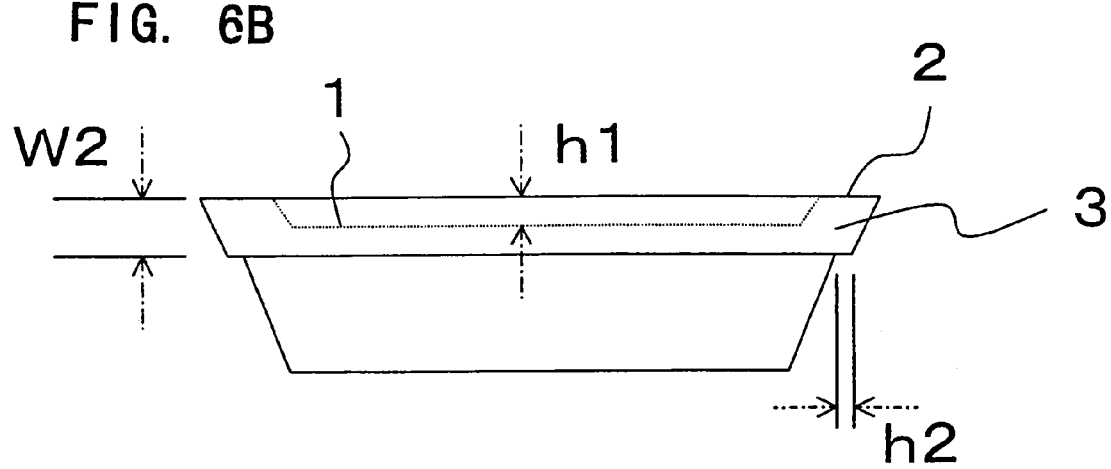

The substrates were machined by machining the rake surface and the flank surface using an electric discharge machine and a surface grinder, respectively, so that blanks will be shaped as shown in FIG. 6 and so that the step in the vicinity of the cutting edge will be configured as shown in Table 5. Meanwhile, substrates shown in FIG. 6 was prepared by forming a recess centrally of the rake surface of the substrate by an electric discharge machine to generate a step dimensioned in Table 5 along the four sides of the rake surface, and by forming a step in the vicinity of the cutting edge of each rake surface, using an electric discharge machine. There was also provided a substrate having no step (sample 30). The produced substrates were electrolytically etched, at a current density of 0.15 A/cm$^2$ and at a maximum removing rate of 0.65 μm/min, using a 5% KCl aqueous solution as an electrolytic solution. On the surface of the electrolytically etched substrate surface were deposited products of the electrolytic reaction. These products were removed by washing in a 10% aqueous solution of NaOH.

The produced substrates had their surface activated with diamond particles, as in Example A, and were coated with diamond to a thickness of 30 μm by the micro-wave plasma CVD method. The rake surface and the flank surface of the diamond-coated substrates were polished, as in Example A. It was found that the substrate could be worked to a cutting edge R not larger than 10 μm in a shorter time than with the sample 30 having no step in the vicinity of the cutting edge, as shown in table 5.

In the cutting tests, similar to that in Example A, it was found that the polishing performance which is the same as the insert devoid of the step (sample 30) shown in Table 5 was achieved.

cutting edge shown in Table 6. Meanwhile, in the substrate shown in FIG. 7, an octagonal-shaped recess was formed by an electric discharge machine at the center of the rake surface of the substrate so that a step dimensioned as shown in Table 6 will be formed at each of the four corners of a square-shaped substrate rounded at the four corners.

This substrate was subjected to heat treatment, diamond coating and polishing for sharpening the bit end, as in Example A. Table 6 shows the operating conditions.

With the sample having steps at the four corners (samples 31 to 33: Comparative Examples), splitting of molding metal die of an upper punch into two becomes complex to

TABLE 5

Example C (step shape conforms to FIGS. 6)

| samples | step width W (mm) | step width W (mm) | step height h (mm) | step height h (mm) | rake surface polishing time (min) | flank polishing time (min) | cutting edge R (μm) | depth of cut (mm) | initial surface roughness Rz (μm) |
|---|---|---|---|---|---|---|---|---|---|
| 27 | 0.5 | 0.5 | 0.1 | 0.1 | 30 | 10 | 5 | 0.2 | 3.7 |
| 28 | 1.0 | 1.0 | 0.1 | 0.1 | 90 | 20 | 5 | 0.3 | 3.7 |
| 29 | 1.5 | 1.0 | 0.1 | 0.1 | 120 | 20 | 10 | 0.5 | 4.2 |
| 30 | ISO shape without step | | | | 360 | 30 | 5 | 0.3 | 3.6 |

Example D

Figure 7A:
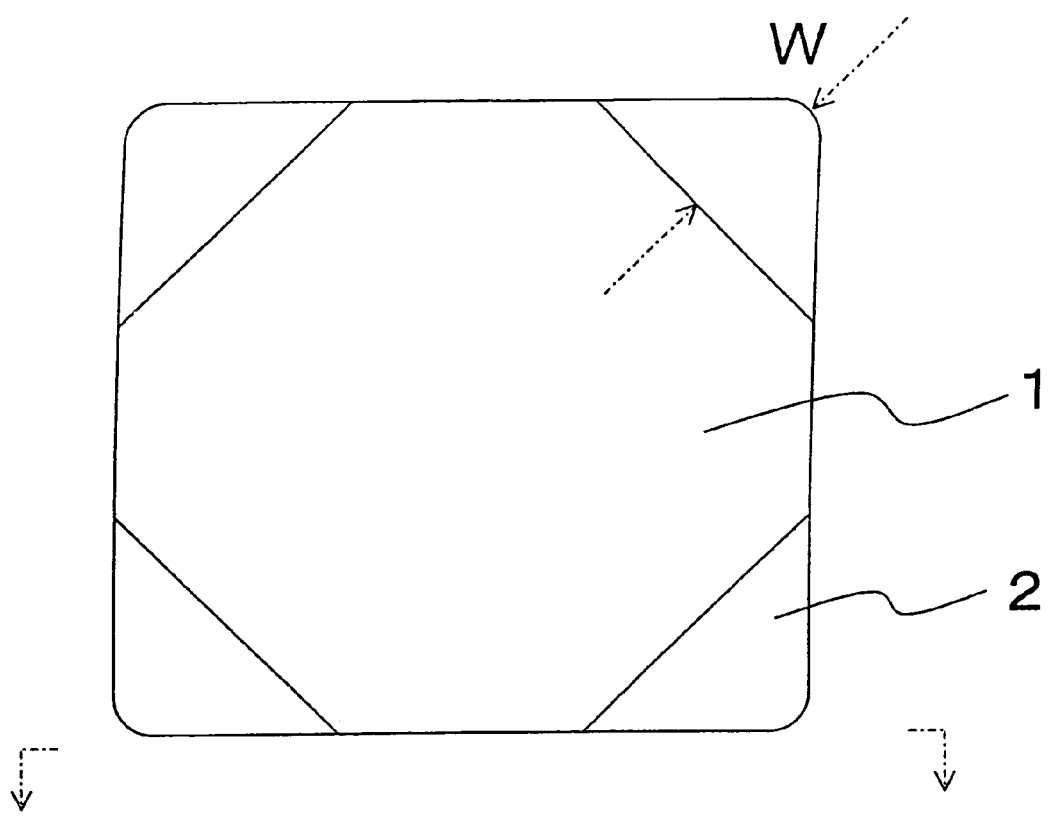
Figure 7B:
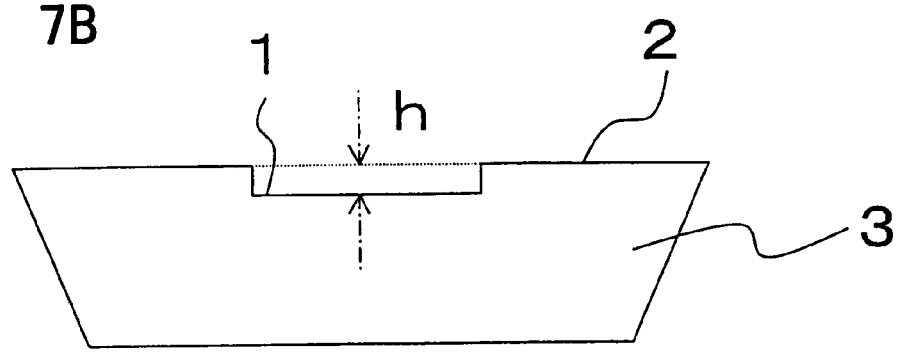

Using starting powders (see table 6), adjusted to a mixing ratio of the composition C (see Table 1) of the Example A, and also using a press molding metal die for molding having a convex shaped portion for affording a step on the rake surface of the substrate, starting powders were press-molded at a pressure of 1.5 ton/cm$^2$ (approximately 1.47×10$^4$ N/cm$^2$), a compacted powder mass, having a step in a portion corresponding to the rake surface, was prepared. This compacted powder mass was sintered in the same way as in Example A and its surface was polished to prepare a cemented carbide substrate of a basic shape of the ISO standard SPGN 120304 having a step shaped as shown in FIG. 7 (samples 31 to 33: Comparative Examples) or as shown in FIG. 3 (sample 34: Example) and a step of the render powder molding difficult. Moreover, the sample cannot cope with a case in which a long cutting edge is required for cutting, such as cutting of a sprue projection of a piston for an engine having an outer diameter of 110 mm and a length of approximately 110 mm (see FIG. 8). On the other hand, the method of forming a step by the post-processing leads to an increased number of steps and higher manufacturing costs (see JP Patent Kokai JP-A-7-60509 for an insert for a cutting tool having steps at the four corners and the method of providing a step by the post-processing). Conversely, with a sample having an annular step on its outer rim (sample 34: Example), powders can be molded easily at the time of manufacturing a substrate, while molding by a biaxial molding machine having upper and lower punches is facilitated.

TABLE 6

Example D

| samples | material composition | substrate shape | step shape | step width W (mm) | step height h (mm) | areal ratio of cutting face area (%) | rake surface polishing time (min) | flank polishing time (min) | number of times of machining operations for the outer diameter | number of times of machining operations for the head portion | state of machining operations |
|---|---|---|---|---|---|---|---|---|---|---|---|
| 31 | C | SPGN120304 | FIG. 7 | 2.0 | 0.05 | 10 | 20 | 30 | ≧10 | ≧5 | initial peeling at step |
| 32 | C | SPGN120304 | FIG. 7 | 3.0 | 0.1 | 22 | 60 | 30 | ≧3000 | ≧5 | peeling occurred at step |
| 33 | C | SPGN120304 | FIG. 7 | 5.0 | 0.1 | 62 | >200 | 30 | 15000 | ≧5000 | peeling of diamond film occurred during machining of the head portion |

TABLE 6-continued

Example D

| samples | material composition | substrate shape | step shape | step width W (mm) | step height h (mm) | areal ratio of cutting face area (%) | rake surface polishing time (min) | flank polishing time (min) | number of times of machining operations for the outer diameter | number of times of machining operations for the head portion | state of machining operations |
|---|---|---|---|---|---|---|---|---|---|---|---|
| 34 | C | SPGN120304 | FIG. 3 | 1.0 | 0.1 | 30 | 90 | 30 | 15000 to 20000 | 30000 to 35000 | burrs produced in a work due to wear of cutting so that tool service life end was reached |

The relation between the step height, amount of warp and the length of a diagonal line in the substrates in the above Examples is explained. If the amount of warp is larger than the step height, the diamond film at the center of the rake surface is contacted with the polishing wheel, so that provision of the step becomes meaningless. Therefore, the amount of warp is desirably smaller than the step height. If the length of the diagonal line of the substrate becomes longer, the amount of warp becomes larger. It is therefore necessary to set the step height depending on the length of the diagonal line. Thus, equations approximating straight lines which determine the range of the amount of warp of the substrate, given the substrate height and the effective step height, are set in the following manner:

upper limit (amount of warp:μm)=5/6(length of diagonal line: mm)+10/3 lower limit (amount of warp:μm)=2(length of diagonal line: mm)+4

Figure 9:
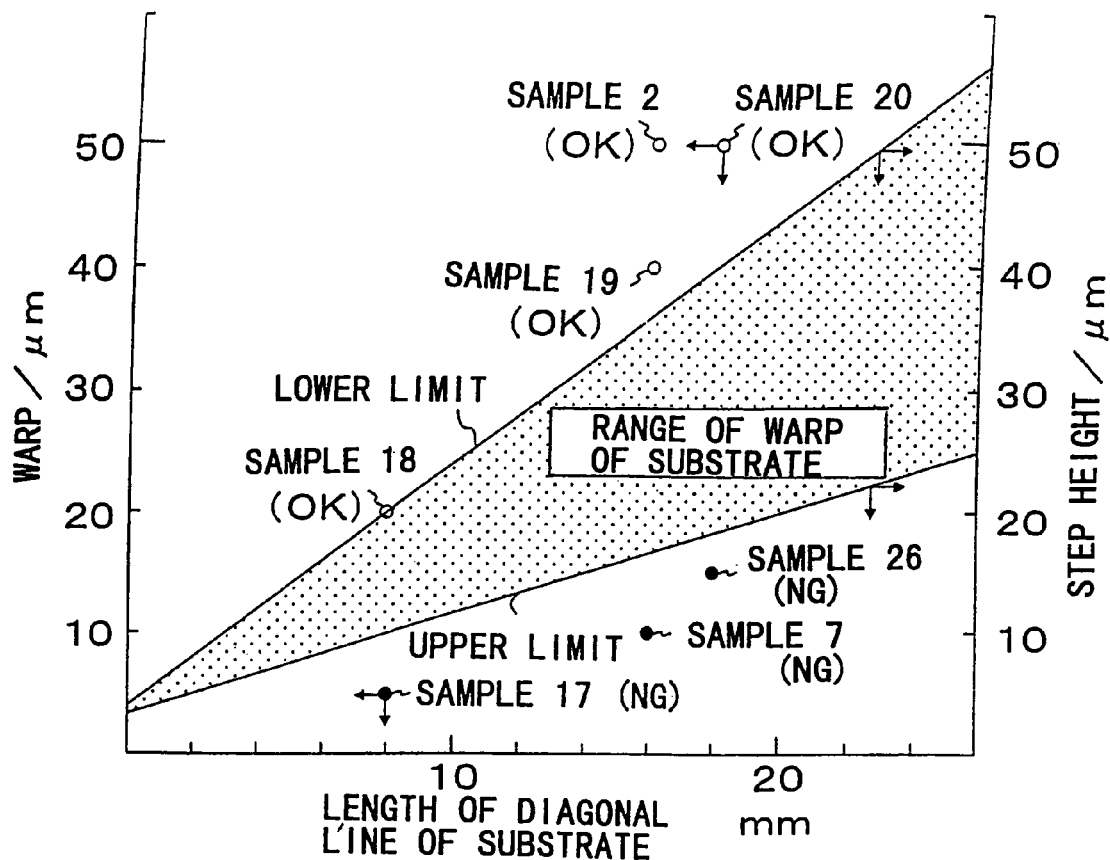
FIG. 9 shows the relation between the step height and the amount of warp in pre-set samples and the length of a diagonal line of a substrate as well as the results of evaluation thereof.

Meanwhile, those samples lying in an area below the upper limit line were not usable marked as "NG" and those lying in an area above the lower limit were usable marked as "OK". FIG. 9 shows the relation between the step height, amount of warp and the length of the diagonal line of the substrate, as well as the results of evaluation of the respective samples.

Meritorious Effects of the Invention

With the cutting tool according to the present invention, its edge can be polished in a short time without setting special conditions. The cutting tool of the present invention cuts satisfactorily, such that, with the use of this cutting tool, the workpiece can be cut to an optimum machined state. Therefore, the cutting tool according to the present invention is used satisfactorily especially as a tool for finishing machining.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A cutting tool coated with diamond, comprising diamond coated as a film on a substrate having a portion raised at a pre-set width to form a step along a cutting edge on a rake surface or on a flank surface, and wherein said step of said rake surface is at least partially L- or V-shaped with a corner or corners as an apex or as apices, further wherein the rake surface in its entirety is substantially of a square or parallelepiped shape and further wherein the height h in μm of said rake surface and a length W in mm along a diagonal line of said rake surface in its entirety satisfy the relationship h ≧(2 W*/1000)+4 μm, wherein W* is the length in μm of length W.

2. The cutting tool coated with diamond as defined in claim 1,
wherein the substrate includes a step 15 to 500 μm in height in the vicinity of the cutting edge on the rake surface or the flank surface.

3. The cutting tool coated with diamond as defined in claim 2,
wherein the coated film of diamond has a thickness of 10 to 50 μm.

4. The cutting tool coated with diamond as defined in claim 1,
wherein a portion of the film of diamond on the rake surface or on the flank surface which has been coated on said step is preferentially polished to sharpen at least said cutting edge.

5. The cutting tool coated with diamond as defined in claim 1,
wherein the coated film of diamond has a thickness of 10 to 50 μm.

6. The cutting tool coated with diamond as defined in claim 1,
wherein the tool is configured for use as a throw-away insert.

7. The cutting tool coated with diamond as defined in claim 1,
wherein the substrate includes a portion raised at a pre-set width in the vicinity of and along a cutting edge on a rake surface or on a flank surface of the cutting tool.

8. The cutting tool coated with diamond as defined in claim 7,
wherein said raised portion forms a step of 15 to 500 μm in height.

9. The cutting tool coated with diamond as defined in claim 1, wherein said substrate has a surface that is pre-processed to improve adhesion between said substrate and the film of diamond and to create deformation of said substrate, and further wherein the height of said step is related to the deformation.

* * * * *